Feb. 27, 1934.  G. A. DE VLIEG  1,949,116
REAMER
Filed Dec. 24, 1930
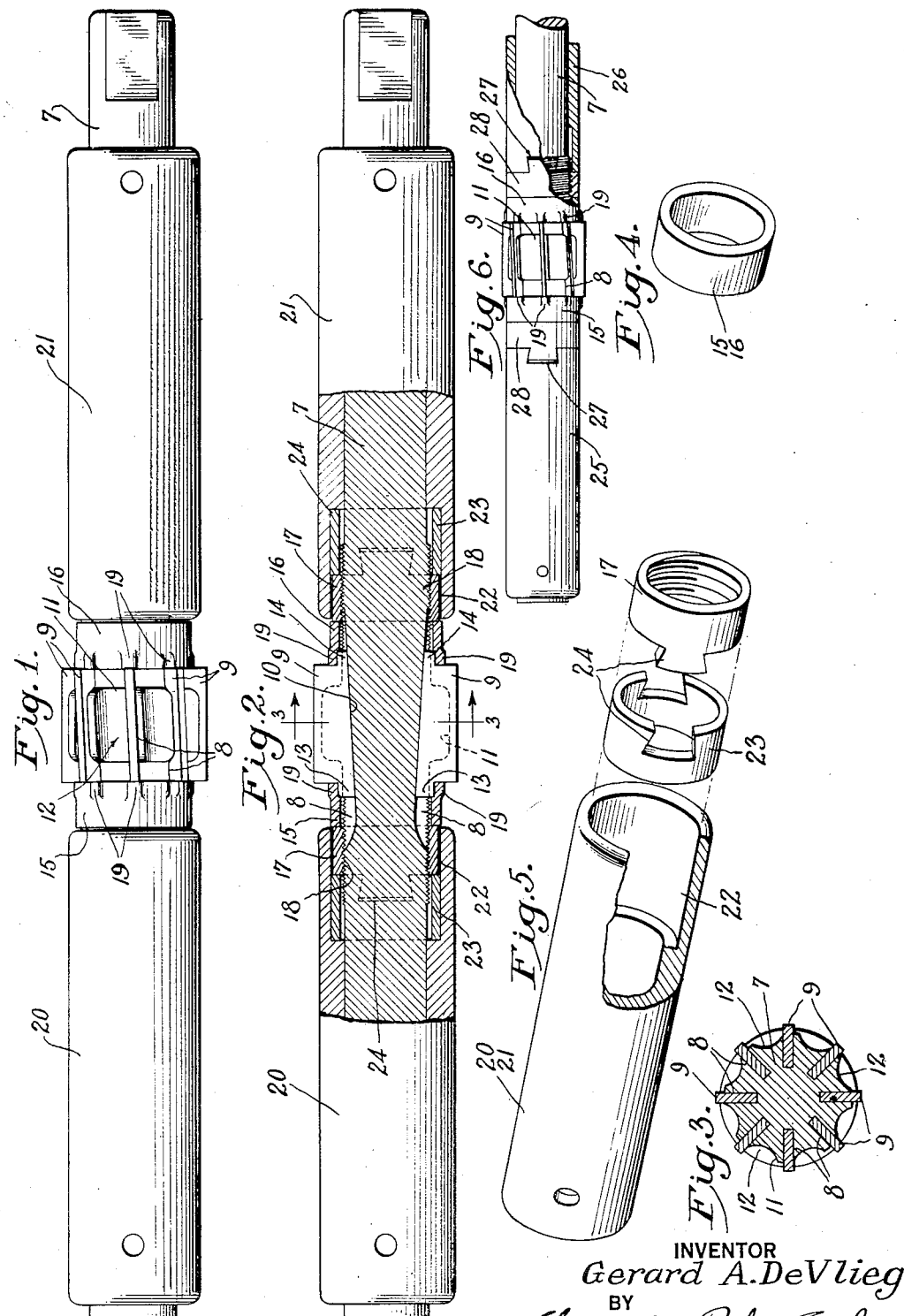
INVENTOR
*Gerard A. DeVlieg*
BY
ATTORNEYS Patented Feb. 27, 1934

1,949,116

UNITED STATES PATENT OFFICE 1,949,116

REAMER

Gerard A. De Vlieg, Rockford, Ill.

Application December 24, 1930
Serial No. 504,564

6 Claims. (Cl. 77—75.5)

The invention relates generally to reamers and more particularly to adjustable reamers of the expansion type.

The primary object of the invention is to provide a new and improved adjustable reamer.

Another object is to provide an improved adjustable reamer embodying a plurality of blades together with novel means for adjusting the blades and for securing the blades in their adjusted position.

Another object is to provide an improved reamer embodying a shank having a tapered portion against which a plurality of blades are positioned in circumferentially spaced relation and embodying means for clamping the blades radially against the shank and means for clamping the blades in their adjusted position on the shank.

Another object is to provide such a reamer in which the means for adjusting the blades and securing the blades in their adjusted position embodies soft metal members which engage projections on the ends of the blades and which expand as the blades are adjusted to compensate for the increased diameters of the clamping portions as the reamer is expanded.

Further objects and advantages will become apparent from the following description taken in connection with the accompanying drawing, in which:

Figure 1 is an elevational view of a preferred form of the invention.

Fig. 2 is a similar view partly in central section.

Fig. 3 is a transverse section along the line 3—3 of Fig. 2.

Fig. 4 is a perspective view of a soft metal clamping part.

Fig. 5 is a perspective view of a clamping nut and nut operating means for one end of the reamer.

Fig. 6 is a fragmentary elevation partly in section of a modified form of the invention.

While the invention is susceptible of various modifications and alternative constructions, I have shown in the drawing and shall herein describe in detail the preferred embodiment, together with a modified form thereof, but it is to be understood that I do not intend to limit the invention to the specific construction disclosed but aim to cover all modifications and alternative constructions falling within the spirit and scope of the invention as expressed in the appended claims.

As illustrated in Figs. 1 to 5 of the drawing, the preferred form of the invention comprises a shank 7 adapted to be mounted in a suitable holder (not shown). The end portions of this shank are cylindrical in form as shown most clearly in Fig. 2. The central portion is provided with a plurality of circumferentially spaced longitudinally extending slots 8 in which blades 9 are positioned, the bottoms 10 of the slots and blades being tapered or inclined as shown in Fig. 2 so that by moving the blades longitudinally in the slots, the cutting circle of the blades may be increased or decreased. The portions of the shank between the blades form a means for positioning the blades circumferentially around the shank. These portions are preferably enlarged as indicated at 11 so as to provide a rigid backing for the blades, and are provided with clearance grooves 12.

In the forms disclosed herein, the ends of the blades 9 are substantially radial and are provided with projecting portions 13 and 14 which have longitudinally extending straight outer edges. Rings 15 and 16, which are adjustable longitudinally of the shank for the purpose of adjusting the blades, encircle the projecting portions 13 and 14 and abut the ends of the blades to clamp the blades to the shank and to secure them in position thereon. These rings are adapted to be clamped in their adjusted position by means of nuts 17 which are screw-threaded onto the shank at 18. The rings are preferably formed of a relatively soft or ductile metal such as copper so that as the blades 9 are moved toward the right (Fig. 2) to increase the cutting diameter, and the portions 13 and 14 of the blades spread outwardly, said blade portions become embedded in the rings which expand as indicated at 19. This deformation of the soft metal rings not only permits the blades to be adjusted but also enables the longitudinally adjustable rings to have an effective abutment with the ends of the blades and still provide a radial clamping effect on the blades against the shank.

Pilot sleeves 20 and 21 are provided surrounding the end portions of the shank 7. These pilot sleeves have enlarged recesses 22 in their adjacent ends into which the nuts 17 fit, and are provided with collars 23 secured tightly therein, which collars have dove-tailed connections 24 with the nuts. Thus the pilot sleeves 20 and 21 form a means for operating the nuts.

As illustrated in Fig. 6, pilot sleeves 25 and 26 are provided with dove-tailed joints 27 connecting directly with clamping nuts 28. In this form of the invention the clamping nuts also engage soft metal rings 15 and 16 which are provided for holding the cutter blades 9 in position. The shank 7 may be of the same form as illustrated in Figs. 1 to 3.

I claim as my invention:

1. A reamer comprising, in combination, a shank having a plurality of circumferentially spaced longitudinally extending tapered bottom slots therein, a plurality of blades positioned in said slots, said blades having tapered bottom edges so that by moving the blades longitudinally of the shank the cutting circle may be expanded or contracted and having substantially radial ends with longitudinally projecting portions extending therefrom, soft metal rings surrounding said projecting portions and abutting the adjacent ends of the blades, nuts threaded on said shank operable to adjust and to clamp said blades, pilot sleeves surrounding the end portions of said shank having enlarged recesses in their adjacent ends into which said nuts fit and annular collars secured in said recesses, said collars and nuts having interengaging dove-tailed joints.

2. A reamer comprising, in combination, a shank having a plurality of circumferentially spaced longitudinally extending tapered bottom slots therein, a plurality of blades positioned in said slots, said blades having tapered bottom edges so that by moving the blades longitudinally of the shank the cutting circle may be expanded or contracted and having substantially radial ends with longitudinally projecting portions extending therefrom, soft metal rings surrounding said projecting portions and abutting the adjacent ends of the blades, nuts threaded on said shank operable to adjust and to clamp said blades, pilot sleeves surrounding the end portions of said shank and means connecting said sleeves to said nuts.

3. A reamer comprising, in combination, a shank, a plurality of separate generally longitudinally extending blades on said shank, said blades being radially adjustable upon movement longitudinally of said shank, adjustable means on said shank for clamping said blades at one end, each blade at the other end being formed with a generally radial surface facing endwise and a longitudinal surface generally parallel to the reamer axis and facing outwardly, a deformable ring adjustably mounted on said shank, one end of said ring engaging said radial surfaces of said blades and the inner periphery of said ring engaging said longitudinal surfaces, and clamping means on said shank engaging the other end of said ring.

4. A reamer comprising, in combination, a shank having a threaded portion, cutter means defining a plurality of generally longitudinal cutting edges adjustable longitudinally on said shank, means on one end of said shank coacting with the adjacent end of said cutter means for limiting movement of the latter, a sleeve on the other end of said shank, and a nut in engagement with said threaded portion and coacting with the adjacent end of said cutter means to secure the latter in position of adjustment, said nut having a detachable dove-tailed notch and tongue connection with the adjacent end of said sleeve.

5. A reamer comprising, in combination, a shank having a threaded portion, cutter means defining a plurality of generally longitudinal cutting edges adjustable longitudinally on said shank, means on one end of said shank coacting with the adjacent end of said cutter means for limiting movement of the latter, a pilot sleeve on the other end of said shank, the inner end of said sleeve having an enlarged counterbore, a sleeve rigidly secured in said counterbore and being formed on its outer end with two diametrically opposed dove-tailed notches, and a nut in engagement with said threaded portion for coacting with the adjacent end of said cutter means to secure the latter in position of adjustment, said nut being located substantially within said counterbore and having two diametrically opposed dove-tailed tongues on its inner end in interfitting engagement with said notches.

6. A reamer comprising, in combination, a shank having a threaded portion, cutter means defining a plurality of generally longitudinal cutting edges adjustable longitudinally on said shank, means on one end of said shank coacting with the adjacent end of said cutter means for limiting movement of the latter, a pilot sleeve on the other end of said shank, the inner end of said sleeve having an enlarged counterbore, a sleeve rigidly secured in said counterbore and being formed on its outer end with a dove-tailed notch, and a nut in engagement with said threaded portion for coacting with the adjacent end of said cutter means to secure the latter in position of adjustment, said nut having a dove-tailed tongue on its inner end in interfitting engagement with said notch.

GERARD A. DE VLIEG.